United States Patent [19]
Stolt et al.

[11] 3,824,872
[45] July 23, 1974

[54] EPICYCLIC GEAR

[75] Inventors: Jan Stolt; Christer Gerward, both of Vasteras, Sweden

[73] Assignee: Stal-Laval Turbin AB, Vesteras, Sweden

[22] Filed: Oct. 16, 1972

[21] Appl. No.: 297,649

[30] Foreign Application Priority Data
Oct. 18, 1971 Sweden............................. 13140/71

[52] U.S. Cl. ............................................... 74/411
[51] Int. Cl. ............................................ F16h 57/00
[58] Field of Search ............... 74/411, 801; 64/11 R

[56] References Cited
UNITED STATES PATENTS
2,611,284  9/1952  Albee............................. 74/411 X FOREIGN PATENTS OR APPLICATIONS
211,335  1/1963  Sweden................................. 74/411
200,709  3/1963  Sweden................................. 74/411
324,564  1/1930  Great Britain........................ 74/411

*Primary Examiner*—Leonard H. Gerin

[57] ABSTRACT

An epicyclic gear train, comprising a sun-wheel and an outer internally toothed gear ring both in engagement with star wheels which are mounted on a carrier; the outer gear ring and its shaft being connected through a cardan joint for the purpose of preventing external angular motion from disturbing the axial alignment of the shafts of the sun-wheel and the outer gear ring. The cardan joint comprises a laminated ring coupling fastened between a flange on the outer gear ring and a flange on its shaft.

3 Claims, 1 Drawing Figure

PATENTED JUL 23 1974 3,824,872
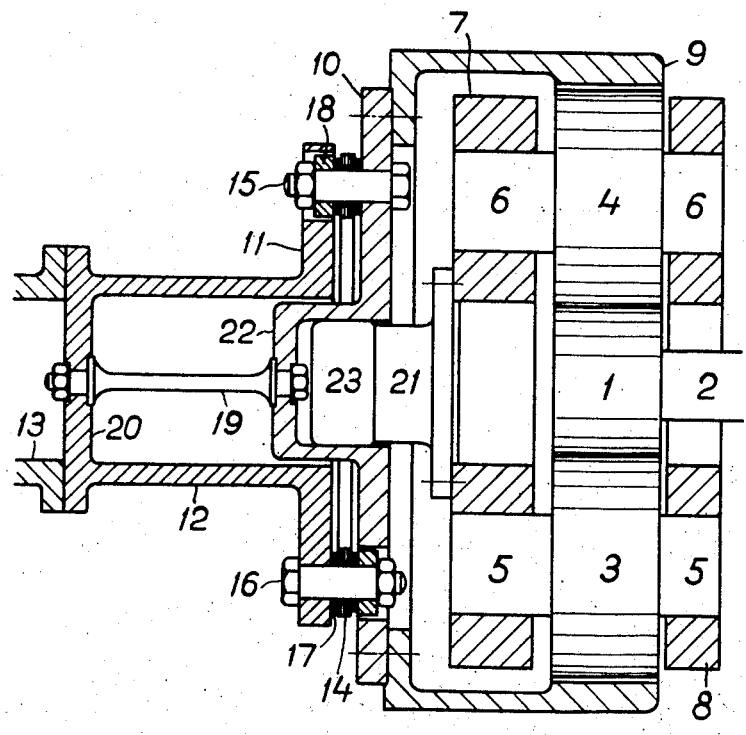

EPICYCLIC GEAR

BACKGROUND OF THE INVENTION

Epicyclic gear, also known as planetary or star gear, have many applications where they may be mounted in structures in motion and where, consequently, angular stress acting against the axial alignment of these gear may well be encountered. Since such gear systems require precision for smooth and efficient operation and cannot withstand any significant relative axial displacement of their parts, their use in these circumstances is prohibited unless provision is made to offset the angular distorting forces.

As an example, epicyclic gear are used in turbine-powered vessels to reduce the high engine speed of the turbines, the sun-wheel shaft being connected to the turbine, while the shaft of the internally toothed gear ring is connected to the propeller, generally through another gear. The torsional and flexural stress on the hull of the vessel will be transmitted to the machinery, and some relative motion between the different parts will occur. This motion must be prevented from propagating into the epicyclic gear system to avoid axial displacement.

SUMMARY OF THE INVENTION

It is the principal object of this invention to provide for the successful use of epicyclic gear systems under the conditions described above. To overcome the angular distorting motion which occurs, this invention introduces a cardan joint between the internally toothed gear ring and its shaft. The cardan joint is produced by mounting a laminated ring coupling between a flange on the internally toothed gear ring and a flange on its shaft. The laminated ring coupling is particularly advantageous for this use, where the motions applied against it are relatively small, and in that the laminated ring provides a cardan joint of moderate size and space requirements. Provision is made for freeing the laminated ring from axial forces by inserting a flexible inner shaft between the internally toothed gear ring and its shaft.

The invention will be further described in precise detail with reference to the accompanying drawing, and defined by the accompanying claims.

DRAWINGS

The drawing is a cross-sectional view of an epicyclic gear according to this invention.

DESCRIPTION

The illustrative preferred embodiment of this invention shown in the accompanying drawing is a star gear type in which the star-wheels are stationary and the outer internally toothed gear ring is rotating.

The gear system shown comprises a sun-wheel 1 on a shaft 2 which, for example, may be connected to a turbine (not shown). The sun-wheel 1 is in engagement with starwheels 3, 4, which are mounted on pins 5, 5 and 6, 6, respectively, in star-wheel carriers 7, 8. The carriers 7 and 8 are mutually connected in a manner not shown, and carrier 8 is firmly connected either with the gear housing (not shown) or possibly with an extra rotating pinion (also not shown). The star-wheels 3, 4 engage an outer internally toothed gear ring 9.

Gear ring 9 is bolted to a flange 10 which is connected to a second flange 11, which, in turn, is part of the output shaft 12, 13.

The flanges 10 and 11 are connected to each other through the laminated coupling ring 14, mounted between the flanges by means of bolts 15, 16, which are alternately engaged in the flanges 10, 11. The laminated ring 14 preferably may be constructed of a plurality of thin metal plates which are held together by bushings 17 before being assembled. Bolts 15, 16 are threaded through bushings 17 and are connected with them by means of washers 18 and conventional nuts.

Laminated ring 14 should be free from axial forces, and this may be accomplished, according to the invention, by the inclusion of an inner shaft 19 which, in order to absorb small motions in an axial plane, must have a certain degree of flexibility. Shaft 19 suitably may be made of spring steel with its length in relation to its thickness such that it can withstand rotating under slight bending. One end of inner shaft 19 is fixed to a flange 20 in the output shaft 12, 13, while the other end of shaft 19 is connected to flange 10.

With the provision of shaft 19 in this manner, some angular motion between the shafts 2 and 12 in the axial plane may occur without laminated ring 14 being exposed to any axial influence.

A further feature of this invention provides, as may be often desirable, means for mutually mounting planetwheel carrier 7 and internally toothed gear ring 9 in bearings. This can be achieved, as shown, by providing the carrier 7 with a shaft pin 21, attached thereto by flange. Shaft pin 21 rests in a bearing casing 22 included in flange 10. Casing 22 is designed as a hood, at the base of which inner shaft 19 is attached. Bearing part 23 of shaft pin 21 is suitably positioned so that its center is in the same plane as laminated ring 14 in the axial direction. In this way, only purely radial stresses appear between the shaft pin 21, 23 and the laminated ring 14, and thus no torsional stresses in the axial plane. Such torsional stresses would be likely to cause oblique pressure between the shaft pin 21, 23 and the bearing casing 22.

While the preferred embodiment described herein relates to the turbine propulsion of vessels in which the combined planet-wheel carrier 7, 8 is stationary and gear ring 9 is rotating, other embodiments involving the rotation of the planet-wheel carrier are contemplated and are within the scope of this invention. The control and counterbalancing of angular motions arising in an axial plane of epicyclic gear by the elements claimed is the inventive concept.

What is claimed:

1. Epicyclic gear train, comprising:
    a sun-wheel;
    a sun-wheel shaft, carrying said sun-wheel;
    a star-wheel carrier with star-wheels rotatably mounted thereon;
    an internally toothed gear ring, engaging said star-wheels;
    a gear ring shaft, positioned in the same axial plane as said sun-wheel shaft;
    mounting means on said internally toothed gear ring;
    mounting means on said gear ring shaft;
    a laminated ring coupling, mounted between said mounting means on said internally toothed gear ring and said mounting means on said gear ring shaft, whereby said laminated ring coupling provides a cardan joint for offsetting angular motion between said sun-wheel shaft and said gear ring shaft in their common axial plane;
a shaft pin, attached to said starwheel carrier;
a bearing mounted on said shaft pin; and
a bearing housing in said mounting means on said internally toothed gear ring, holding said bearing positioned so that the central portion of said bearing is substantially in the same plane as said laminated ring coupling.

2. Epicyclic gear train, comprising:
a sun-wheel;
a sun-wheel shaft, carrying said sun-wheel;
a star-wheel carrier with star-wheels rotatably mounted thereon;
an internally toothed gear ring, engaging said starwheels;
a gear ring shaft, positioned in the same axial plane as said sun-wheel shaft;
mounting means on said internally toothed gear ring;

mounting means on said gear ring shaft;
a laminated ring coupling, mounted between said mounting means on said internally toothed gear ring and said mounting means on said gear ring shaft, whereby said laminated ring coupling provides a cardan joint for offsetting angular motion between said sun-wheel shaft and said gear ring shaft in their common axial plane; and
a flexible shaft, positioned coaxially with and connecting said gear ring shaft and said internally toothed gear ring, whereby said laminated ring coupling is freed from axial forces.

3. Epicyclic gear train, according to claim 1, having a flexible shaft, positioned coaxially with and connecting said gear ring shaft and said internally toothed gear ring, whereby said laminated ring coupling is freed from axial forces.

* * * * *